United States Patent
Hui et al.

(10) Patent No.: US 11,745,390 B2
(45) Date of Patent: Sep. 5, 2023

(54) SYSTEM FOR RECOVERY OF MIXED MULTI-PLASTIC AND NATURAL FIBER

(71) Applicant: INFINICAL TECHNOLOGIES LLC, Richardson, TX (US)

(72) Inventors: Hon Man Hui, Carrollton, TX (US); Zhigang He, Allen, TX (US)

(73) Assignee: INFINICAL TECHNOLOGIES LLC, Richardson, TX (US)

( * ) Notice: Subject to any disclaimer, the term of this patent is extended or adjusted under 35 U.S.C. 154(b) by 0 days.

(21) Appl. No.: 17/606,826

(22) PCT Filed: Apr. 30, 2020

(86) PCT No.: PCT/US2020/030812
§ 371 (c)(1),
(2) Date: Oct. 27, 2021

(87) PCT Pub. No.: WO2020/223534
PCT Pub. Date: Nov. 5, 2020

(65) Prior Publication Data
US 2022/0143872 A1    May 12, 2022

Related U.S. Application Data

(60) Provisional application No. 62/841,667, filed on May 1, 2019, provisional application No. 62/841,677, filed on May 1, 2019.

(51) Int. Cl.
*B29B 17/00* (2006.01)
*B29B 17/04* (2006.01)

(52) U.S. Cl.
CPC ...... *B29B 17/0036* (2013.01); *B29B 17/0412* (2013.01); *B29B 2017/0448* (2013.01)

(58) Field of Classification Search
CPC ........ B29B 2017/0448; B29B 17/0036; B29B 17/0412; D21D 1/006; D21D 1/30;
(Continued)

(56) References Cited

U.S. PATENT DOCUMENTS

| | | | |
|---|---|---|---|
| 4,143,001 A | 3/1979 | Raab et al. | |
| 5,707,016 A * | 1/1998 | Witsken | D21D 1/303 241/261.3 |

(Continued)

FOREIGN PATENT DOCUMENTS

| | | |
|---|---|---|
| CN | 108437278 A | 8/2018 |
| DE | 29814921 U1 | 1/1999 |

(Continued)

OTHER PUBLICATIONS

English Translation of JP-2001138326-A retrieved from Espacenet on Dec. 8, 2022 (Year: 2022).*

(Continued)

*Primary Examiner* — Francisco W Tschen
*Assistant Examiner* — Elisa H Vera
(74) *Attorney, Agent, or Firm* — Polsinelli PC

(57) ABSTRACT

Methods, systems and agglomerators for recovering mixed multi-plastic and natural fiber are described. The systems, methods, and the agglomerator operate at low temperatures to avoid degradation of the plastic film. The agglomerator includes cutting discs that are adjustable.

20 Claims, 13 Drawing Sheets

(58) Field of Classification Search
CPC ......... D21D 1/303; D06C 3/06; Y02W 30/52; Y02W 30/62
See application file for complete search history.

(56) References Cited

U.S. PATENT DOCUMENTS

| | | | | |
|---|---|---|---|---|
| 2010/0200181 A1* | 8/2010 | Tamai | ....................... | D21F 9/00 162/4 |
| 2011/0210469 A1* | 9/2011 | Keller | ................ | B29B 17/0036 264/140 |
| 2012/0199675 A1* | 8/2012 | Kulesa | ................... | B02C 23/38 156/701 |
| 2013/0092768 A1* | 4/2013 | Feichtinger | ......... | B29B 17/0412 366/168.1 |
| 2013/0119575 A1* | 5/2013 | Whaley | ................ | B02C 18/146 241/98 |
| 2013/0306770 A1* | 11/2013 | Sjostrom | ................ | D21D 1/303 241/245 |
| 2017/0167078 A1* | 6/2017 | Åkerblom | ................ | D21B 1/36 |
| 2018/0243798 A1* | 8/2018 | Abraham | ................ | B02C 23/18 |
| 2018/0297240 A1 | 10/2018 | Craven et al. | | |

FOREIGN PATENT DOCUMENTS

| | | | |
|---|---|---|---|
| JP | 2001138326 A | * | 5/2001 |
| WO | 2006000593 A1 | | 1/2006 |
| WO | 2020223534 A1 | | 11/2020 |

OTHER PUBLICATIONS

International Search Report and Written Opinion; PCT Application No. PCT/US2020/030812; dated Sep. 4, 2020.
English abstract of CN 108437278; retrieved from www.espacenet.com on Oct. 26, 2021.

* cited by examiner

SYSTEM FOR RECOVERY OF MIXED MULTI-PLASTIC AND NATURAL FIBER

CROSS-REFERENCE TO RELATED APPLICATIONS

This application is a national stage entry of PCT/US2020/030812 filed Apr. 30, 2020, which claims benefit to U.S. Provisional Application 62/841,667 filed May 1, 2019 and claims benefit to U.S. Provisional Application 62/841,677 filed May 1, 2019, each application is expressly incorporated herein by reference in its entirety.

FIELD OF INVENTION

The present invention relates to systems and processes for recovery of mixed multi-plastic and natural fiber.

BACKGROUND

Traditional recycling systems for plastic scraps often melt the plastic scraps. When the temperature of the plastic scraps reaches approximately 120 degrees C., certain plastics, such as polyethylene, start to melt, but other common plastics are still in scrap pieces flowing with and over the stream. When the temperature reaches approximately 260 degrees C., all plastic scraps are generally melted down. At these temperatures, polyethylene terephthalate melts, but polyethylene and polypropylene are overheated and lose their natural properties of the materials or may even be carbonized. This is why it is difficult to recycle or reclaim many multi-layer films. Currently over 90% of multi-layer films from food packaging industry are sent to landfills every day due to this inability to be recycled.

Plastic film containing polyvinylidene chloride is commonly used in the food packaging industry. Polyvinylidene chloride is difficult to recover without degradation. It is one of the biggest challenges in the food packaging related recycling. It is also the key reason why a majority of the post-industry and post-residential food packaging film scraps are currently being sent to landfills nationwide every day. Polyvinylidene chloride is typically combined with other plastics like polypropylene, polyethylene, and nylon. It is usually applied as a thin coating or laminate to a base film or it is coextruded with other resins to produce a multilayer film or sheet to improve the barrier properties of the base film. Polyvinylidene chloride contains chlorine, which cause concern about end-of-life disposal through incineration where it generates a similar quantity of dioxins as polyvinyl chloride. Unfortunately, even though polyvinylidene chloride may only form 10-12% by weight of certain plastic waste, the presence of polyvinylidene chloride will often cause such plastic waste to be directed to the landfill. Polyvinylidene chloride containing film is by far one of the most difficult materials to reclaim as far as environmental safety is concerned.

US Patent Publication 2019/0111586, filed Nov. 16, 2017 describes methods of plastic reclamation and formulas for reclaimed plastic materials. US Patent Publication 2019/0111586 is hereby incorporated by reference.

SUMMARY

Described herein are methods, systems, and agglomerators for recovering mixed multi plastic and natural fiber materials.

A system for the recovery of mixed multi plastic and natural fiber materials is described. The system includes an agglomerator. The agglomerator includes a cutting disc compartment. The cutting disc compartment includes a stationary disc plate and a rotating disc plate. A motor is configured to rotate the rotating disc plate. A chiller is configured to cool the stationary disc plate. An agitator receives scraps of mixed multilayer plastic film. The agitator is positioned over the feeding host. The feeding host is positioned to direct to the scraps of the mixed multilayer plastic film materials to the cutting disc compartment. The cutting disc compartment is configured to agglomerate the scraps of the mixed multilayer plastic film materials into agglomerated particles. A shredder is configured to receive the agglomerated particles from the agglomerator. A main control panel controls the shredder and the agglomerator.

In another aspect, a system for the recovery of mixed multi plastic and natural fiber materials is described. The system includes an agglomerator subsystem to form agglomerated plastic. The agglomerator subsystem includes an agglomerator having a water chiller to form agglomerated plastic at a temperature less than 170 degrees C. The agglomerator subsystem further including a shredder to shred the agglomerated plastic. The system includes a mixing subsystem to mix the agglomerated plastic with additional agglomerated plastic, natural fiber or other additive to form a mixture. The mixing subsystem including a vertical mixer to mix the agglomerated plastic with the additional agglomerated plastic, natural fiber, or other additive into the mixture. A crushing subsystem forms a powder from the mixture. The crushing subsystem including a pulverizer to reduce a particle size of the mixture.

In another aspect, an agglomerator for the recovery of mixed multilayer plastic film materials is described. The agglomerator includes a cutting disc compartment having a stationary disc plate and a rotating disc plate. A motor is configured to rotate the rotating disc plate. A chiller is configured to cool the stationary disc plate. A feeding host includes an auger. An agitator receives scraps of mixed multilayer plastic film materials. The agitator is positioned over the feeding host. The auger of the feeding host is positioned to direct the scraps of the mixed multilayer plastic film materials through the stationary disc plate and into contact with the rotating disc plate. The rotating disc plate and the stationary disc plate agglomerate the scraps of mixed multilayer plastic film materials into agglomerated particles. An adjustable nut is configured to move the rotating disc plate toward and away from the stationary disc plate.

In another aspect, an agglomerator for the recovery of mixed multilayer plastic film materials is described. The agglomerator includes a cutting disc compartment. The cutting disc compartment includes a stationary disc plate and a rotating disc plate. A motor is configured to rotate the rotating disc plate. A chiller is configured to cool the stationary disc plate. The agglomerator includes a feeding host. An agitator receives scraps of mixed multilayer plastic film materials. The agitator is positioned over the feeding host. The feeding host is positioned to direct the scraps of the mixed multilayer plastic film materials to the cutting disc compartment. The cutting disc compartment is configured to agglomerate the scraps of mixed multilayer plastic film materials into agglomerated particles. A disc separation distance control to adjust the distance between the stationary disc plate and the rotating disc plate by moving the rotating disc plate toward or away from the stationary disc plate. A motor speed control adjusts a motor speed of the motor. A feeding speed control modulates a volume of the scraps directed to the cutting disc compartment.

In another aspect, a method for the recovery of mixed multi plastic and natural fiber materials is described. The method includes directing scraps of mixed multilayer plastic film materials to an agglomerator. The agglomerator include a stationary disc plate and a rotating disc plate. The method includes rotating the rotating disc plate. The method includes adjusting a distance between the stationary disc plate and the rotating disc plate. The method includes cooling the stationary disc plate. The method includes agglomerating the scraps between the stationary disc plate and the rotating disc plate into plastic particles.

In another aspect, a method of recycling multilayer plastic film containing polyvinylidene chloride is described. The method includes directing scraps of multilayer plastic film containing polyvinylidene chloride to an agglomerator. The agglomerator includes a stationary disc plate and a rotating disc plate. The method includes rotating the rotating disc plate. The method includes cooling the stationary disc plate. The method includes agglomerating the scraps between the stationary disc plate and the rotating disc plate into plastic particles. The method includes directing the plastic particles to a shredder.

The systems, methods, and the agglomerator disclosed herein provide a proper balance of melting point and temperature for recovering a mixed stream of a multilayer plastic film.

The systems, methods, and the agglomerator disclosed herein generally avoid corrosive effects of degrading polyvinylidene chloride in plastic material during a recovery process by operating at temperatures less than approximately 170 degrees C.

DETAILED DESCRIPTION OF INVENTION

Figure 1:
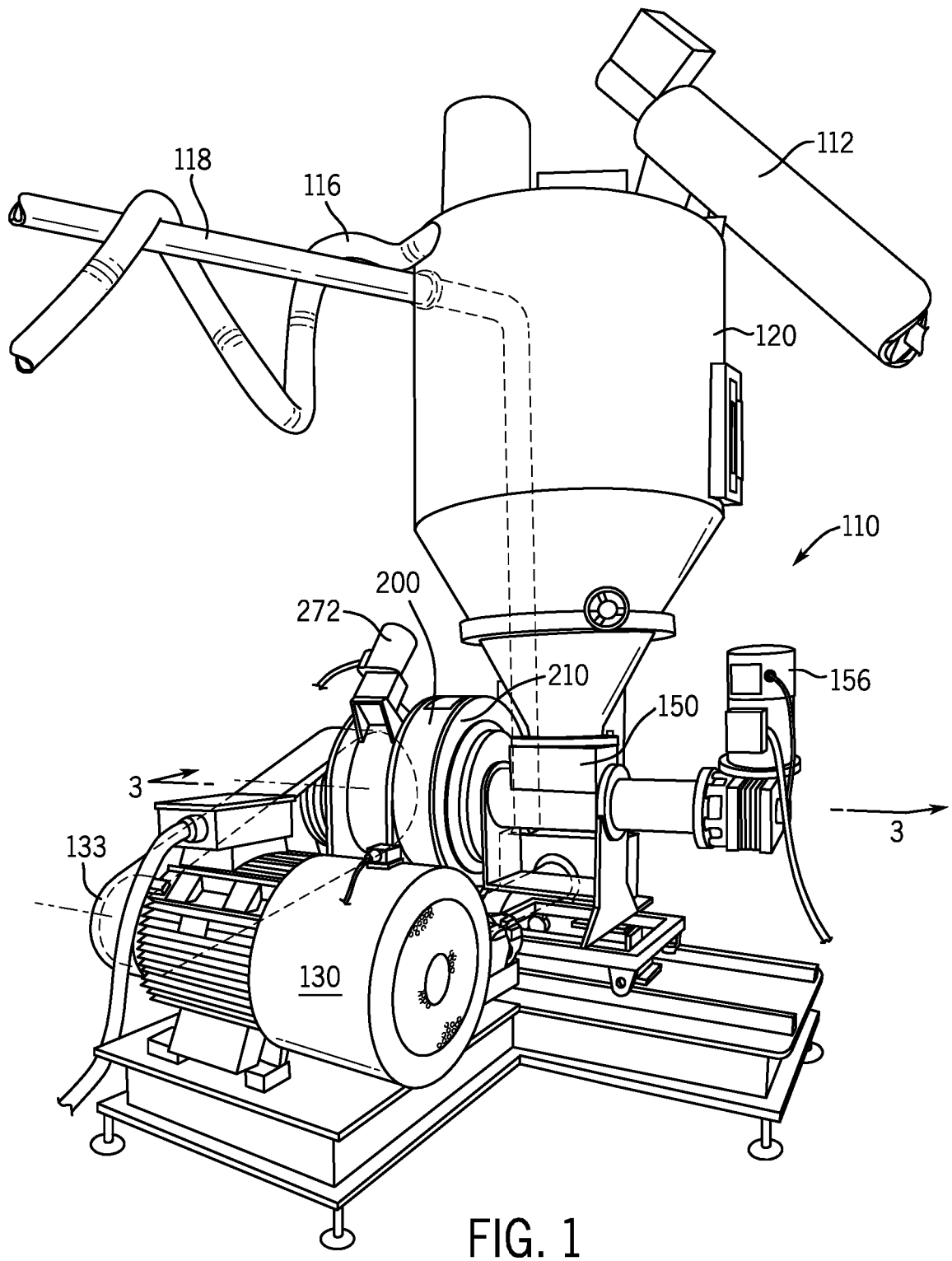
FIG. 1 is a perspective view of the agglomerator.

Systems and processes for recovery of mixed multi plastic and natural fibers will now be described with reference to FIGS. 1-15. A system 10 generally includes an agglomeration subsystem 100 that includes an agglomerator 110 that agglomerates scrap of mixed multilayer plastic film into beans and twigs and a small shredder 190 that converts the beans and twigs to generally all beans. Next, the beans are transferred to a mixing subsystem 300, which includes a mixer, such as a vertical mixer 310, where the beans are mixed with additional beans of a different plastic material or a natural fiber material. Third, the mixture of beans are transferred to a crushing subsystem 500, which includes a pulverizer 510 or other milling equipment to convert the mixture of beans (and possibly the natural fiber material or additives) into a plastic composite powder. The plastic composite powder may now be ready for use in other industrial processes. Optionally, the composite plastic powder may be transferred to a compounding subsystem 700, which may include a compound mixer 710, where the composite plastic powder is mixed with other plastic composites, wood powders, wood composite powders, paper powders, and/or other natural fiber materials, additives, etc. and forms a compound material. The system 10 includes a main control panel 50 in communication with and directing the subsystems 100, 300, 500, 700 and their respective components and processes. Various conveyors, augers, hoses (with vacuum and blowers) may interconnect the various subsystems 100, 300, 500, 700.

Figure 2:
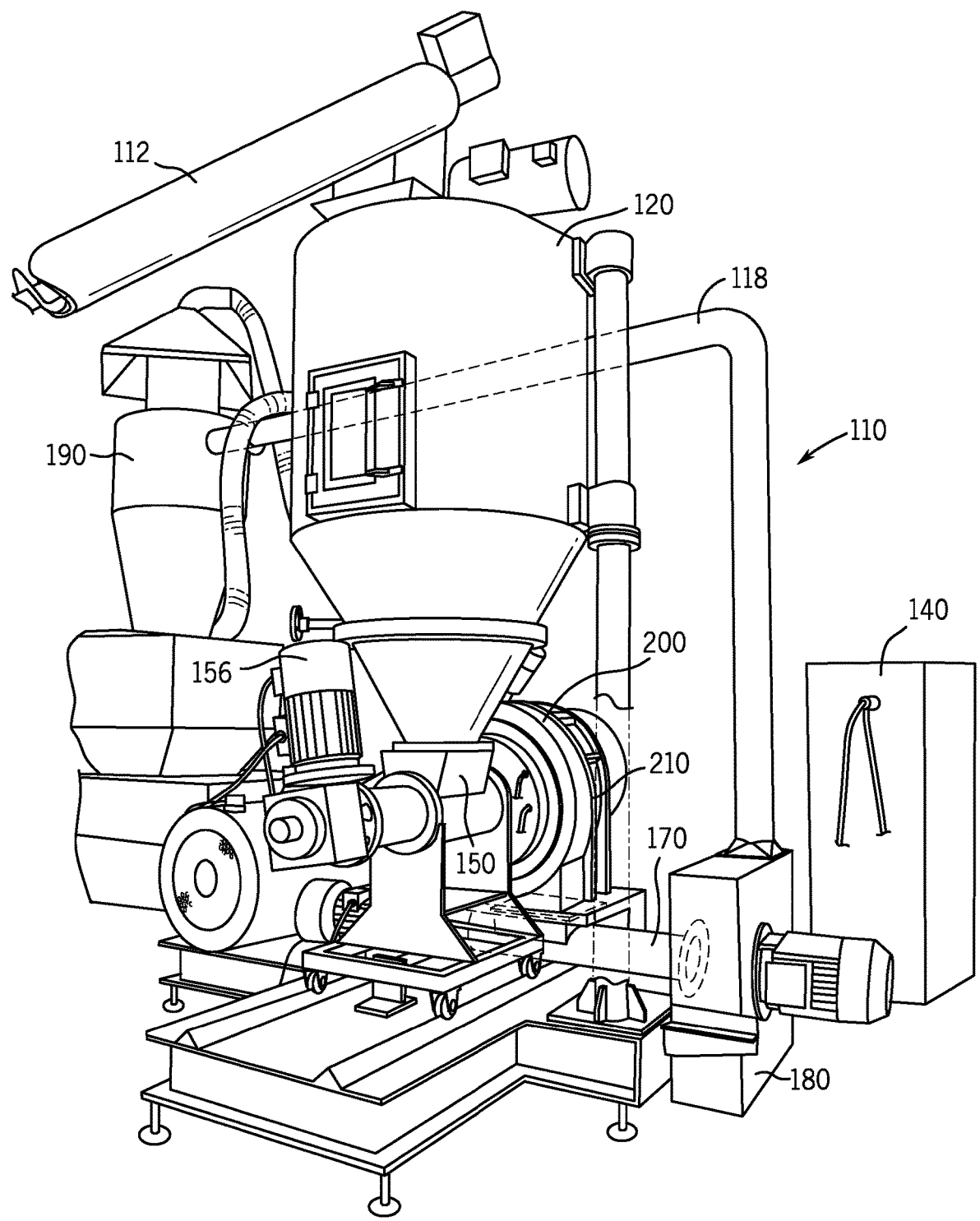
FIG. 2 is a rear perspective view of the agglomerator.

With reference to FIGS. 1 and 2, the agglomerator subsystem 100 includes the agglomerator 110, which generally includes a main agitator 120, a main motor 130, a cutter disc compartment 200, a water chiller 140, a feeding host 150, a replaceable pipe 170, and a blowing fan 180. The agglomerator 110 may supply the beans and twigs to the shredder 190 of the agglomerator subsystem 100 to further shred the beans and twigs into smaller plastic beans.

The plastics may include mixed multilayer films which includes laminated and/or multilayer plastic materials of one or more different plastics. For example, polypropylene, polyethylene, and nylon are often layered with polyvinylidene chloride. As described above, polyvinylidene chloride layered films should not be heated at high temperatures. The system 10 described herein processes laminated and multilayer plastic film at a low temperature of less than approximately 170 degrees C.

The mixed multilayer plastic film is in the form of scraps. These scraps may have maximum dimensions of approximately two inches in height, approximately two inches in width, and two inches in height with irregular shapes and a non-uniform size distribution. Of course, the scraps may be provided in larger and/smaller shapes and dimension.

Figure 3:
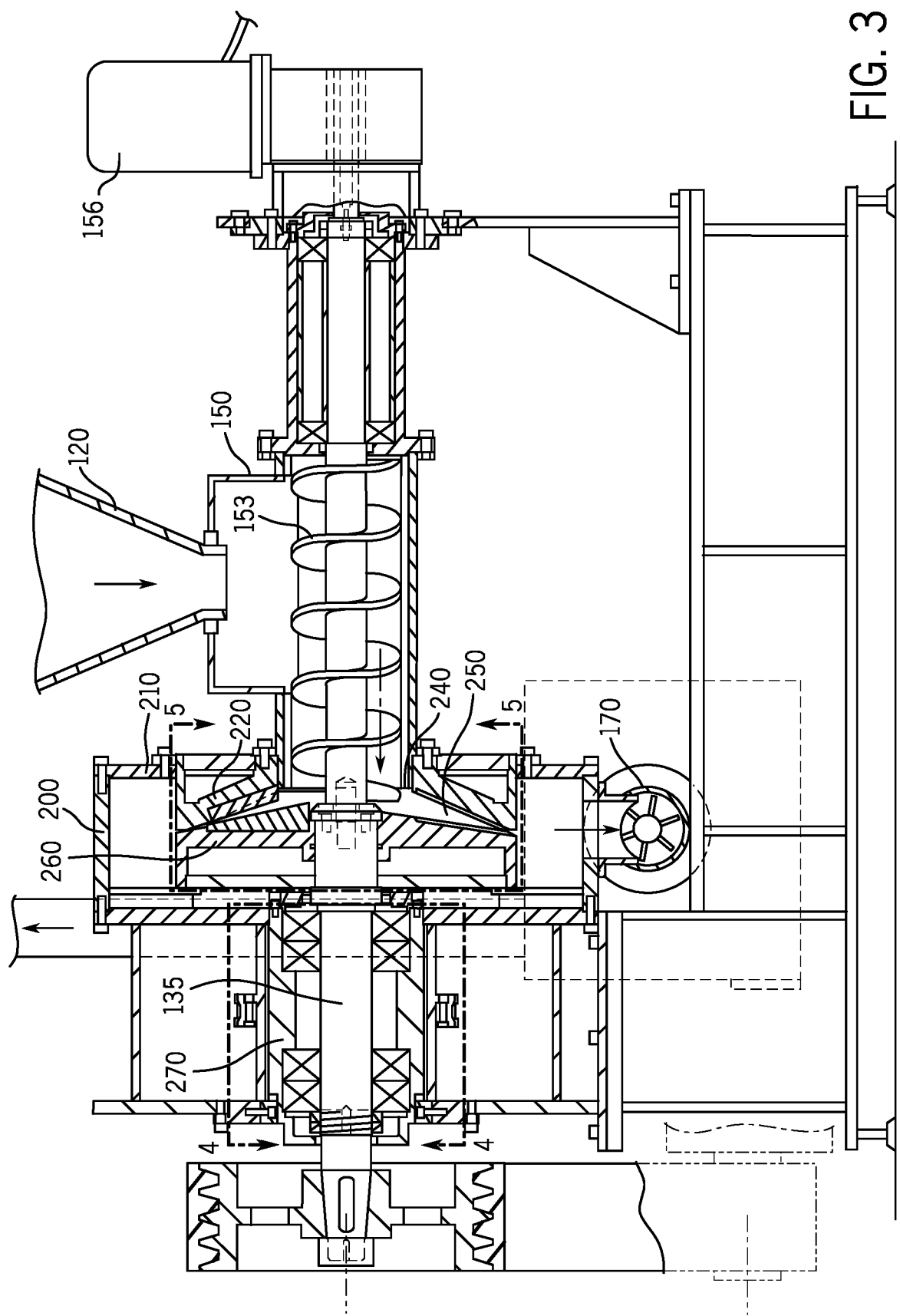
FIG. 3 is a sectional view of the agglomerator.

The cutting disc compartment 200 will now be described with reference to FIGS. 3-7. The cutting disc compartment 200 is the main working compartment of the agglomerator 110. The cutting disc compartment 200 may be structured vertically (as shown in FIG. 3) or horizontally. The cutting disc compartment 200 converts the scraps of plastic material into twig and/or bean shaped plastic particles. The plastic material may be part of mixed stream of different plastic materials and fiber materials.

The twig-shaped plastic particles ("twigs" as used herein) are agglomerated plastic particles that range from approximately 1 inch long to approximately three inches long, and ¼ inch to approximately ½ inch in diameter. One individual twig may be formed from several different pieces of scrap that have been agglomerated together.

The bean-shaped plastic particles ("beans" as used herein) are agglomerated plastic particles that range in diameter from approximately ¼ inch to approximately ½ inch in diameter with irregular and/or non-uniform shapes. The beans may are not limited to spherical or ovular shape. One bean may be formed from several different pieces of scrap that have been agglomerated together.

With reference to FIG. 3, the main agitator 120 temporarily stores the scrap. The main agitator 120 includes stirring arms for circulation of the scrap. The main agitator 120 further includes sensors in communication with the main control panel 50 for startup and pause of the main agitator 120.

The main motor 130 generates power to the cutting disc compartment 200 through a belt drive 133 and a shaft 135. The main motor 130 is in communication with the main control panel 50.

The feeding host 150 transports the scrap dropped from the main agitator 120 and feeds the scrap into the cutter disc compartment 200. In this aspect, the feeding host 150 includes an auger 153. The auger 153 is rotated by a feeding host motor 156 to move the scrap to the cutter disc compartment 200. The auger 153 includes a screw-like construction that moves material laterally to the cutter disc compartment 200. A feeding speed control 158 is configured to modulate a rotation speed of the auger 153 of the feeding host 150 by modulating a speed of the feeding host motor 156.

The cutting disc compartment 200 includes a stationary disc plate 220 and a rotating disc plate 260. The cutting disc compartment 200 includes a housing 210 that may be opened in order to access to the stationary disc plate 220 and the rotating disc plate 260 for maintenance, cleaning, inspection, etc.

The stationary disc plate 220 is generally stationary and does not move during operation. The stationary disc plate 220 is connected with the water chiller 140, which maintains the stationary disc plate 220 at a low temperature. The water chiller 140 maintains a temperature of the stationary disc plate 220 at approximately 30 degrees C. to approximately 45 degrees C. during operation of the agglomerator 110.

Figure 6:
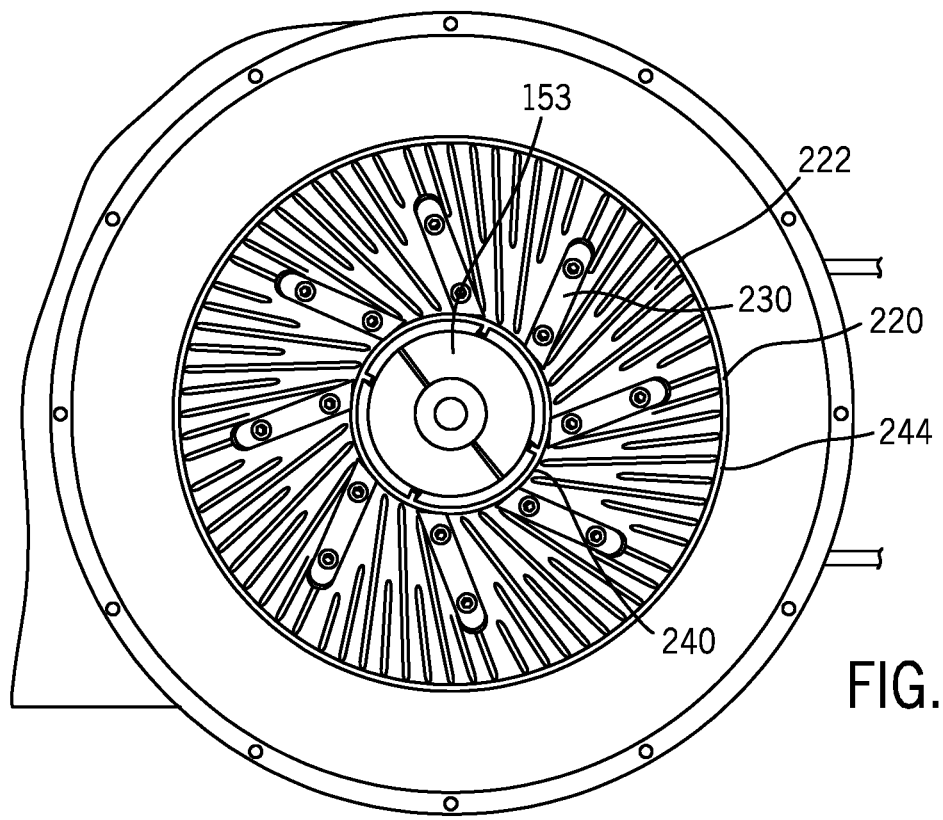
FIG. 6 is an end view of stationary disc plate.

With respect to FIG. 6, in this aspect, the stationary disc plate 220 includes eight (8) blades 230 with a same shape and size mounted on a concave surface 222. In other aspects, the stationary disc plate 220 may have fewer or additional blades 230 with the same or varying size or a non-identical structure. In the aspect shown, the blades 230 have a uniform thickness. The blades 230 include an elongate shape. With respect to FIGS. 5B and 5C, a first end 236 of each blade 230 is fastened proximate to a central opening 240 of the stationary disc plate 220, while a second end 233 of each blade 230 is fastened closer to an edge of the concave surface 222. In the aspect shown, the blades 230 are mounted to the concave surface 222 at angle of approximately 30 degrees to approximately 60 degrees relative to a central axis of the stationary disc plate 220. In this aspect, the blades 230 include a height of approximately $^{11}\!/_{16}$ inches, a width of approximately 1 inches, and a length of approximately of 3⅞ inches on the short side and approximately 4⅜ inches on the long side.

The stationary disc plate 220 includes the central opening 240. An end of the auger 153 passes to or into the central opening 240 and directs the scrap to and/or through the central opening 240. An axis of the auger 153 is aligned with the central opening 240. The central opening 240 leads to a cutting space 250 between the rotating disc plate 260 and the stationary disc plate 220.

The concave surface 222 of the stationary disc plate 220 is generally angled or curved to correspond to a convex surface 262 of the rotating disc plate 260. The concave surface 222 of the stationary disc plate 220 includes multiple grooves 244 distributed evenly on the concave surface 222 of the stationary disc plate 220. The multiple grooves 244 help roll the melted or softened scrap into the twigs.

Figure 5A:
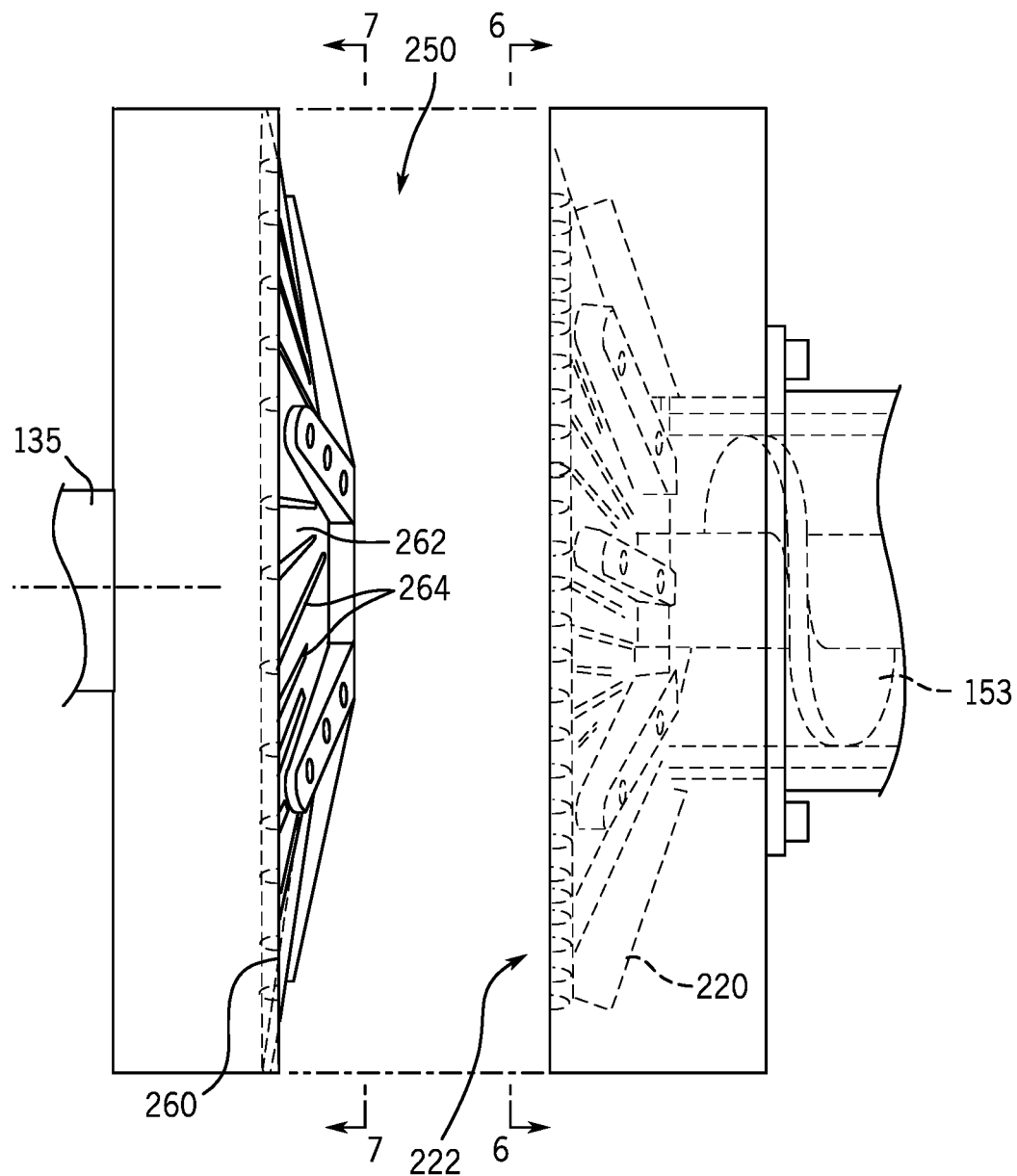
FIG. 5A is a perspective view of the stationary disc plate and the rotating disc plate.
Figure 5B:
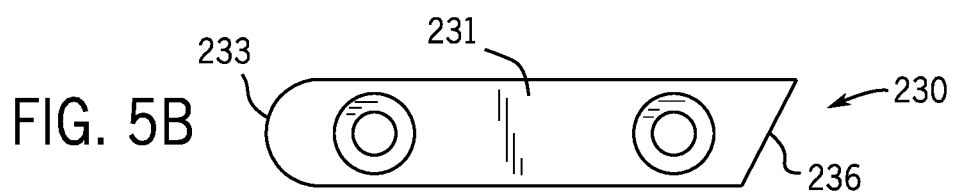
FIG. 5B is an upper view of the blade of the stationary disc plate.
Figure 5C:
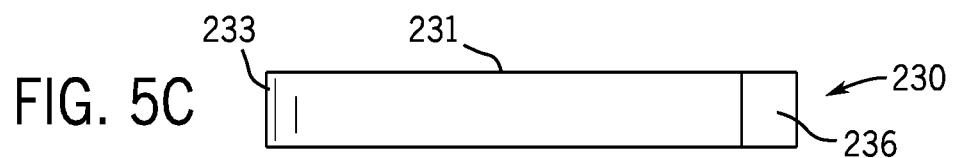
FIG. 5C is a side view of the blade of the stationary disc plate.
Figure 5D:
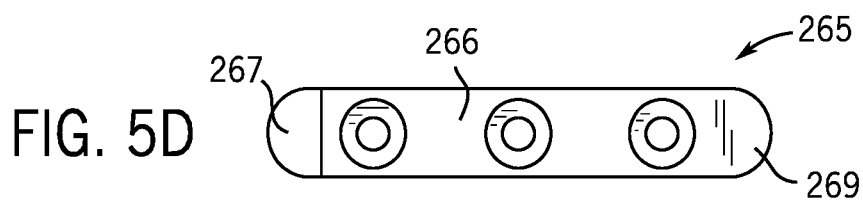
FIG. 5D is an upper view of the long blade of the rotating disc plate.
Figure 5E:
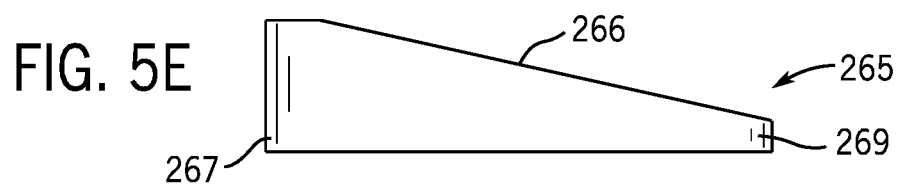
FIG. 5E is a side view of the long blade of the rotating disc plate.
Figure 5F:
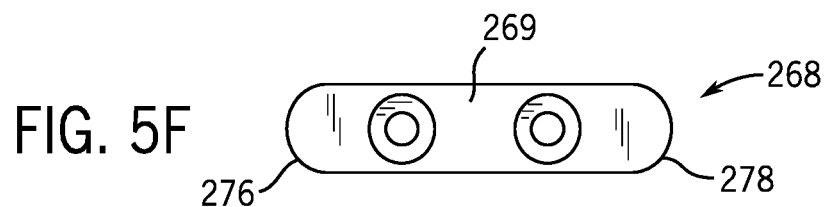
FIG. 5F is an upper view of the short blade of the rotating disc plate.
Figure 5G:
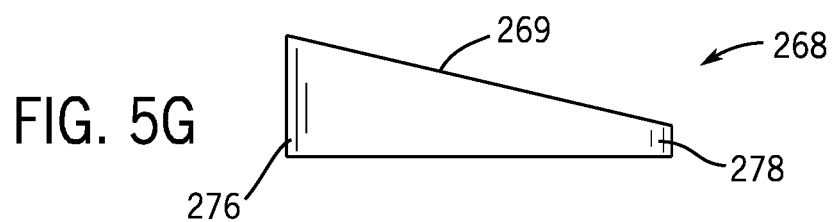
FIG. 5G is a side view of the short blade of the rotating disc plate.

As shown in FIG. 5A, the generally convex surface 262 of the rotating disc plate 260 is in close proximity to the generally concave surface 222 of the stationary disc plate 220. This distance between the rotating disc plate 260 and the stationary disc plate 220 forms the cutting space 250.

Figure 7:
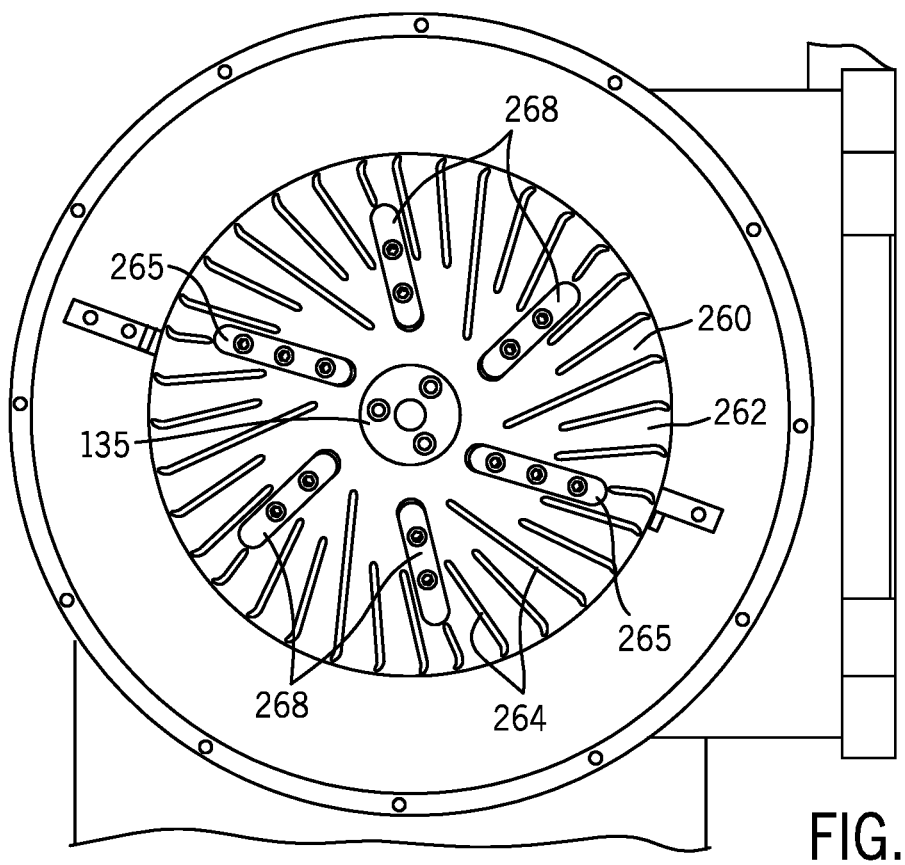
FIG. 7 is an end view of the rotating disc plate.
Figure 8:
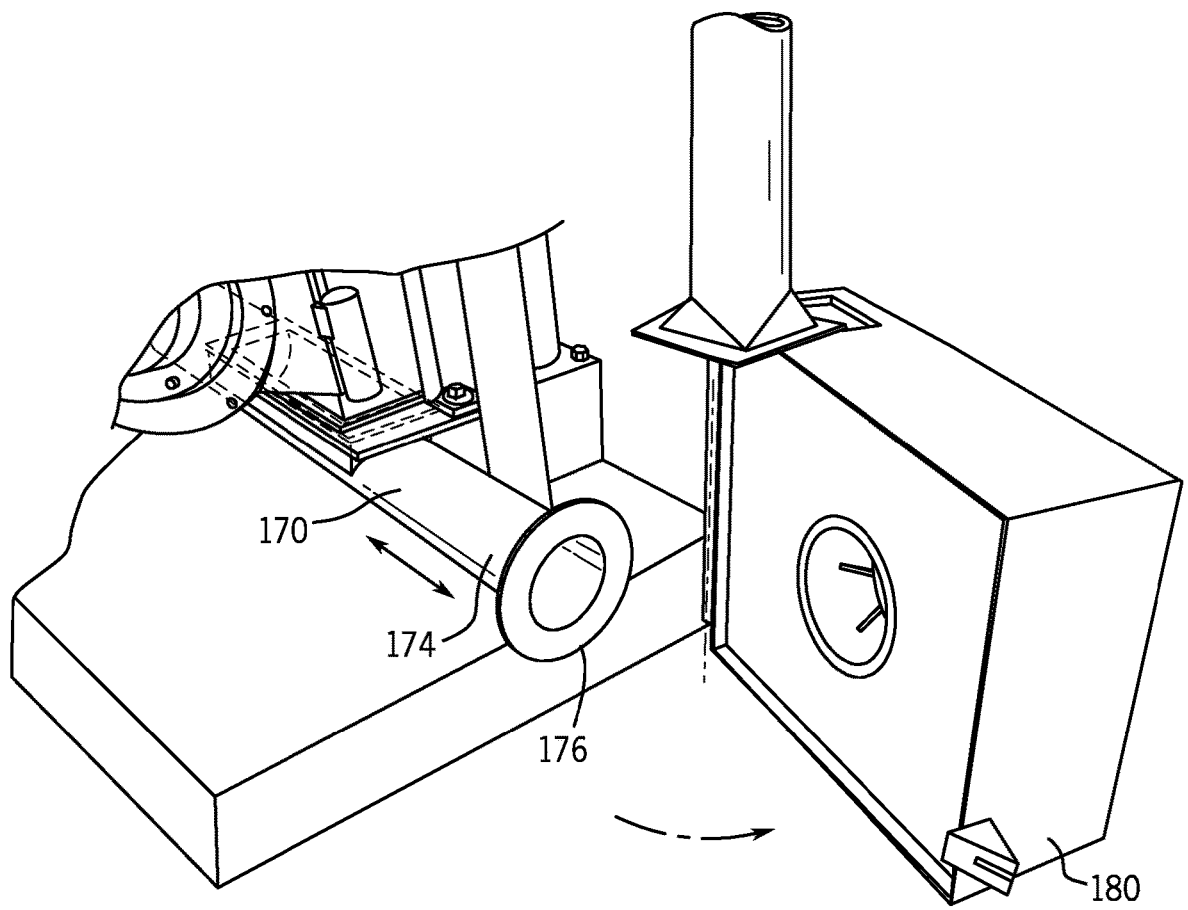
FIG. 8 is a perspective view of the replaceable pipe.
Figure 9:
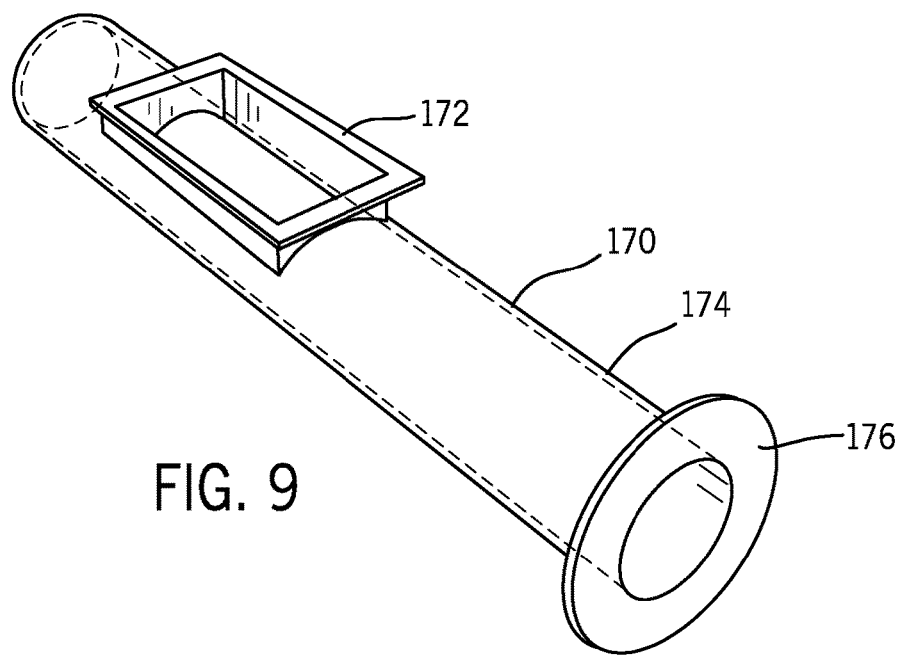
FIG. 9 is a perspective view of the replaceable pipe showing the receptacle.

With respect to FIG. 7, in this aspect, the rotating disc plate 260 spins at a high speed and generates a high temperature to melt or soften the plastic scraps by friction. In this aspect, the rotating disc plate 260 has two (2) long blades 265 and four (4) short blades 268. In other aspects, the stationary disc plate 220 may have fewer or additional blades 265 and 268 with the same or varying size. With respect to FIGS. 5D-5G, the blades 265 include a generally elongate member with a first end 267 fastened proximate an axis of rotation of the rotating disc plate 260. A second end 269 of the blade 265 is fastened closer an edge of the rotating disc plate 260. The blades 268 include a generally elongate member with a first end 276 fastened proximate an axis of rotation of the rotating disc plate 260. A second end 278 of the blade 268 is fastened closer an edge of the rotating disc plate 260. In the aspect shown, the blades 265 and 268 include a raised profile (increased thickness) closer to the axis of rotation of the rotating disc plate 260. In this aspect, the blades 265 include a height of approximately 1⅝ inches on the tall side (the first end 267) and approximately ⅜ inches on the short side (the second end 269), a width of approximately 1 inch, and a length of approximately 5³⁄₁₆ inches. In this aspect, the blades 268 include a height of approximately 1⅜ inches on the tall side (the first end 276) and approximately ⅜ inches on the short side (the second end 278), a width of approximately 1 inch, and a length of approximately 3½ inches.

The rotating disc plate 260 includes the generally convex surface 262. The convex surface 262 of the rotating disc plate 260 includes multiple grooves 264 distributed evenly on the convex surface 262. The multiple grooves 264 help roll the melted or softened scrap pieces into the twigs.

The blades from the rotating disc plate 260 and the stationary disc plate 220 rub the plastic scraps into crimpy plastic twigs or beans due to the friction and variant temperature from the rotating disc plate 260 and the stationary disc plate 220. In the aspect shown, outer surfaces 231 of the blades 230 of the stationary disc plate 220 may be approximately 0.5 mm to 6.5 mm away from outer surfaces 266 and 269 of the blades 265 and 268 of the rotating disc plate 260.

Before operation, the water chiller 140 connected to the stationary disc plate 220 maintains the stationary disc plate 220 at approximately 12 degrees C. During operation, the temperature of the stationary disc plate 220 usually ranges from approximately 30 to approximately 45 degrees C. However, during operation, the rotating disc plate 260 becomes much hotter when rubbing the scrap, and the rotating disc plate 260 may reach approximately 80 to approximately 110 degrees C. Thus, the agglomerator 110 cools the stationary disc plate 220 before and during operation, while the uncooled rotating disc plate 260 heats significantly during operation. This temperature differential between the stationary disc plate 220 and the rotating disc plate 260 assist in forming the twigs and beans. In other aspects, the water chiller 140 may cool the entire cutting disc compartment 200.

Additionally, the shapes and sizes of the blades and construction of the rotating disc plate 260 and the stationary disc plate 220 are configured to rub the plastic scraps into plastic twigs or beans in a relatively low temperature environment without overheating or melting all of plastic scraps. The specific shapes and sizes of the blades and construction of the discs rub the plastic scraps into plastic twigs or beans without heating the plastic scraps to a temperature greater than the melt index of all of the plastics in the scrap.

Figure 4:
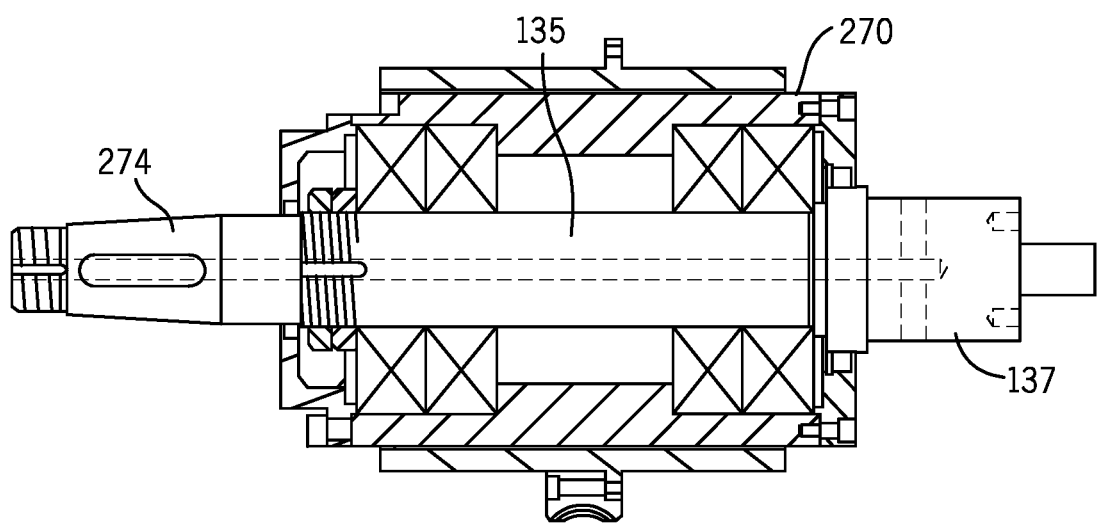
FIG. 4 is a sectional view of the adjustable nut compartment.

With respect to FIG. 4, the adjustable nut compartment 270 adjusts the horizontal movement of the rotating disc plate 260 to modulate or adjust the separation distance between the rotating disc plate 260 and the stationary disc plate 220. In this aspect, the adjustable nut compartment 270 is powered by a small motor 272 above the cutting disc compartment 200. The small motor 272 drives the threaded end 274 to engage or disengage the shaft 135 to extend or withdraw the shaft 135 relative to the stationary disc plate 220. The shaft 135 rotates the rotating disc plate 260 via the belt drive 133 and the main motor 130. The shaft 135 passes through the adjustable nut compartment 270. The shaft 135 rotates relative to the adjustable nut compartment 270 via bearings. The adjustable nut compartment 270 moves the shaft 135 parallel to an axis rotation of the shaft 135, which ultimately moves the rotating disc plate 260 toward and away from the stationary disc plate 220. The shaft 135 includes a hub 137 that fastens to the rotating disc plate 260.

The replaceable pipe 170 transports the twigs and beans from the cutting disc compartment 200 to the remainder of the system 10. The replaceable pipe 170 is removable and replaceable. The replaceable pipe 170 is designed to be quickly accessed and replaced with a spare replaceable pipe 170 in event of an overheated plastic meltdown from the cutting disc compartment 200. This feature allows quick access for clearance and cleaning, and reduces down time of production due to meltdown events. During operation, the twigs and beans drop to a bottom of the replaceable pipe 170 from the cutter disc compartment 200.

The replaceable pipe 170 is positioned below the cutting disc compartment 200. The replaceable pipe 170 includes a receptacle 172. The receptacle 172 is formed in an upper diameter of the replaceable pipe 170. In this aspect, the receptacle 172 includes a generally rectangular shape. The receptacle 172 is sized and configured to engage to a lower opening of the cutting disc compartment 200, such that the beans and twigs fall from the cutting disc compartment 200 as the beans and twigs are agglomerated. In this aspect, the receptacle 172 is formed along a minor portion of an overall length of the replaceable pipe 170. The replaceable pipe 170 has a generally hollow, cylindrical shape to provide for the transfer and movement of the beans and twigs. A distal end 174 of the replaceable pipe 170 includes a connecting portion 176 to engage with the back blowing fan 180. In the aspect shown, the connecting portion 176 is a flange around the distal end 174 that bolts or otherwise connects to a housing for the fan 180. Opposite of the distal end 174, the replaceable pipe 170 includes an end that is contained within the cutting disc compartment 200.

A fan transports the twigs and beans from cutting disc compartment 200 and into the small shredder 190. The small shredder 190 shreds the twigs and beans such the twigs are reduced in sized. Thus, the small shredder 190 processes the twigs and beans to become a more homogenous lot of shredded beans. Uniformity in size is increased by the small shredder 190.

Figure 10:
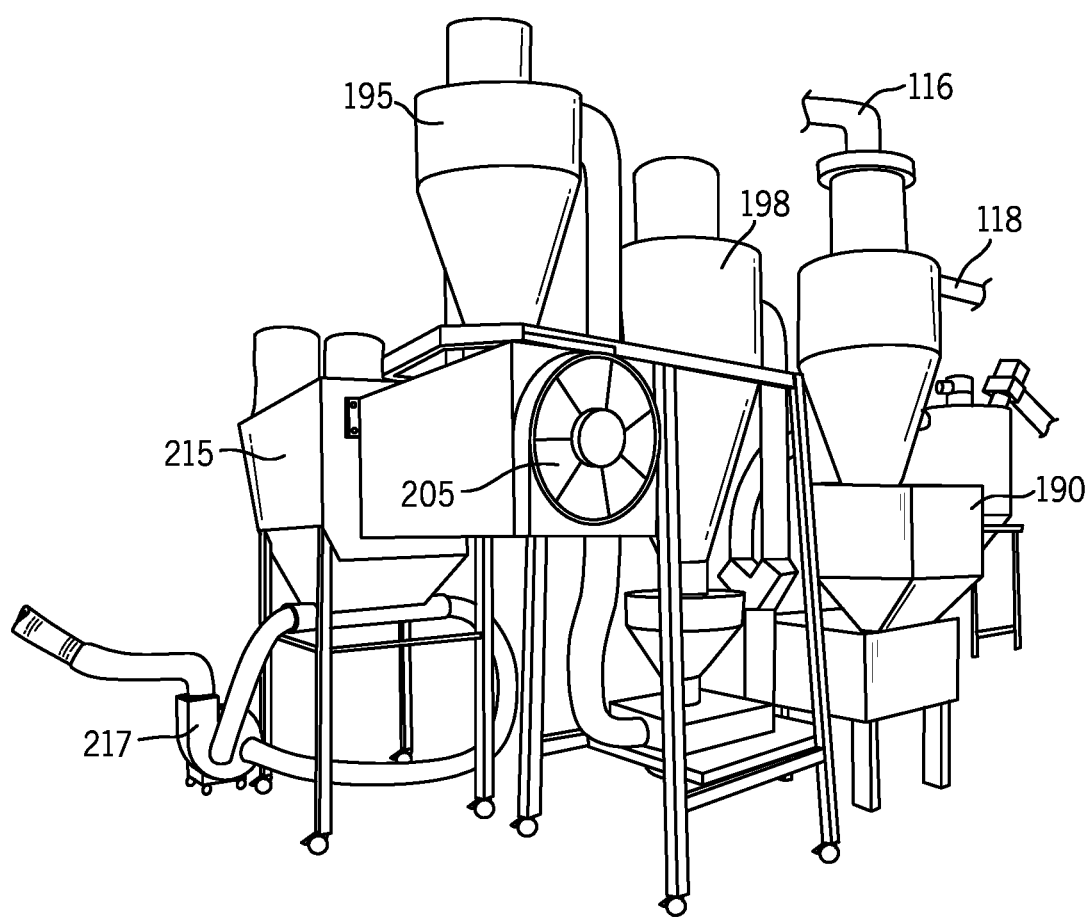
FIG. 10 is a perspective view of the discharge hopper of the agglomeration subsystem.

A small blowing fan 192 transports the shredded beans from the small shredder 190 to a discharge hopper 195, which includes a cooling hopper 198. After cooling, the discharge hopper 195 discharges the shredded plastic beans into storage containers, such as gaylord boxes. As shown in FIG. 10, a large blowing fan 205 underneath the discharge hopper 195 blows semi-agglomerated flakes of scraps out into a hopper collector 215, and then a vacuum feeder 217 transports the flakes from the hopper collector 215 back to the main agitator 120 for reprocess. The large blowing fan 205 blows at or against a stream of the shredded beans in order to separate the flakes from the shredded beans.

In operation, scraps are transferred to the main agitator 120. In this example, the scraps may include three components of layered or laminated film—polyethylene, polypropylene, and polyethylene terephthalate, which each have a different melt index. Of course, the scraps may include any number of layers. The melt index of polyethylene is 120 degrees C., the melt index of polypropylene is 160 degrees C., and the melt index of polyethylene terephthalate is 260 degrees C. When the temperature inside of the cutting disc compartment 200 reaches 120-130 degrees C., the polyethylene melts and liquefy, polypropylene may semi-melt, and polyethylene terephthalate becomes softer, but is still in a solid form. Inside the cutting disc compartment 200, the melted polyethylene stream rubs, wraps, and rolls the other two semi-melted or softened plastics into twigs or beans due to the shape and configuration of the blades, the stationary disc plate 220, and the rotating disc plate 260.

The stationary disc plate 220 is connected with the water chiller 140, which keeps the temperature of the cutting disc compartment 200 below a predetermined threshold of approximately 170 degrees C. A water chiller control 142 drives the water chiller 140. The water chiller control 142 may be an integral component of the water chiller 140. The stationary disc plate 220 is generally maintained at approximately 30-45 degrees C. during operation. The temperature differential between the rotating disc plate 260 and stationary disc plate 220 further enhances the wrapping and rolling process of the plastic scraps. The system 10 and the agglomerator 110 turns plastic scraps into twigs or beans in a relatively low temperature such that less electricity is consumed and the natural properties of the plastic materials are preserved in their best condition such that the plastic materials can be recycled and reused.

Further, the systems and process have the capability to reclaim plastic scraps containing polyvinylidene chloride in a safe low temperature environment. Polyvinylidene chloride is often combined with other less expensive plastics like polypropylene, polyethylene and nylon. Polyvinylidene chloride is usually applied as a thin coating or laminate or it is coextruded with other resins to produce a multilayer film or sheet to improve the barrier properties of the less expensive base film. Polyvinylidene chloride contains chlorine and promotes concerns about end-of-life disposal through incineration where it generates a similar quantity of dioxins as polyvinyl chloride. For recycling process, to avoid the possible corrosive effects of degrading the polyvinylidene chloride in the material, the system 10 is run at low temperature, less than approximately 170 degrees C. Polyvinylidene chloride containing film is by far one of the most difficult materials to reclaim as far as environmental safety as concerned.

Due to the mechanical configurations featured above, the disclosed agglomerator 110 is capable of converting polyvinylidene chloride containing plastic film into plastic twigs or beans in a low temperature environment, more specially, below 170 degrees C., to avoid the possible corrosive effects of degrading the polyvinylidene chloride in the material. This feature makes the disclosed system 10 and the agglomerator 110 effective and innovative for reclaiming plastic scrap containing polyvinylidene chloride.

Due to the mechanical configurations featured above, the disclosed agglomerator 110 is capable of processing mixed stream of laminated or mixed film or multiple plastic components. During the agglomerating process, the scraps of various plastic components are rubbed, wrapped, and rolled altogether in a melted, semi-melted, and/or softened stream. It is an irreversible process that changes the original properties of the constituent plastics into a different materiel. The twigs or beans, formed by agglomeration, provide new physical properties different from any of the original plastic components. The system 10 and processes described herein reclaim laminated, multilayer or mixed film, but also modifies the overall properties of the agglomerated stream of mixed plastic scraps.

The scraps generally do not instantly agglomerate into the twigs and beans. The process conditions are modulated or adjusted by the operator until a proper combination of heat and pressure is achieved in the cutting disc compartment 200. The main control panel 50 includes a programmable logic controller to monitor, display, and adjust the process condition. The scraps do not efficiently agglomerate into the twigs and beans instantly until the right conditions are satisfied. Various sensors are configured to monitor temperature of the cutting disc compartment 200, the rotating disc plate 260, stationary disc plate 220, etc. The cooling level provided by the water chiller 140 may be modulated by the main control panel 50.

The main control panel 50 includes the programmable logic controller that includes controls that are managed and adjusted by the operator in order to generate sufficient heat and pressure within the cutting disc compartment 200 to reach the conditions in which the scrap agglomerates into twigs and beans. The main control 50 includes at least one processor 52 to process data and a memory 54 to store the data. The processor 52 processes communications, builds communications, retrieves data from the memory 54, and stores data to the memory 54. The processor 52 and the memory 54 are hardware. The memory 54 may include volatile and/or non-volatile memory, e.g., a computer-readable storage medium such as a cache, random access memory (RAM), read only memory (ROM), flash memory, or other memory to store data and/or computer-readable executable instructions such as the computer numerical control instructions or program. With respect to FIG. 15, an exemplary layout of the main control panel 50 is illustrated with respect to the system 10. As an example, formulations and process conditions for each formulation may be stored in the memory 54. In addition, the controller 50 further includes at least one communications interface 56 to transmit and receive communications, messages, and/or signals to the components, devices, equipment, and hardware of system 10 and its subsystems 100, 300, 500, and 700 and their sensors, temperature gauges, position sensors, displays, input controls, drive motors, etc. The at least one communications interface 56 may include a touch screen display that shows operating conditions, inputted operating parameters, formulas, system status, motor speeds, production data (hourly and daily), feeding speeds, electrical current, temperatures, weights, volumes, etc. Further, in certain aspects, each of the subsystems 100, 300, 500, and 700 may include their own control unit in communication with the main control panel 50. The main control panel 50 may communicate with other operators, a central processing center, or control panels controlling similar systems in remote locations such the productivity, supplies, and production output data may be centrally collected. The main control panel 50 may communicate with the other operators, the central processing center, or control panels controlling similar systems via 5G/6G telecom technologies, as well as other suitable communication systems such as wired, wireless, Bluetooth, Wi-Fi, etc.

Figure 15:
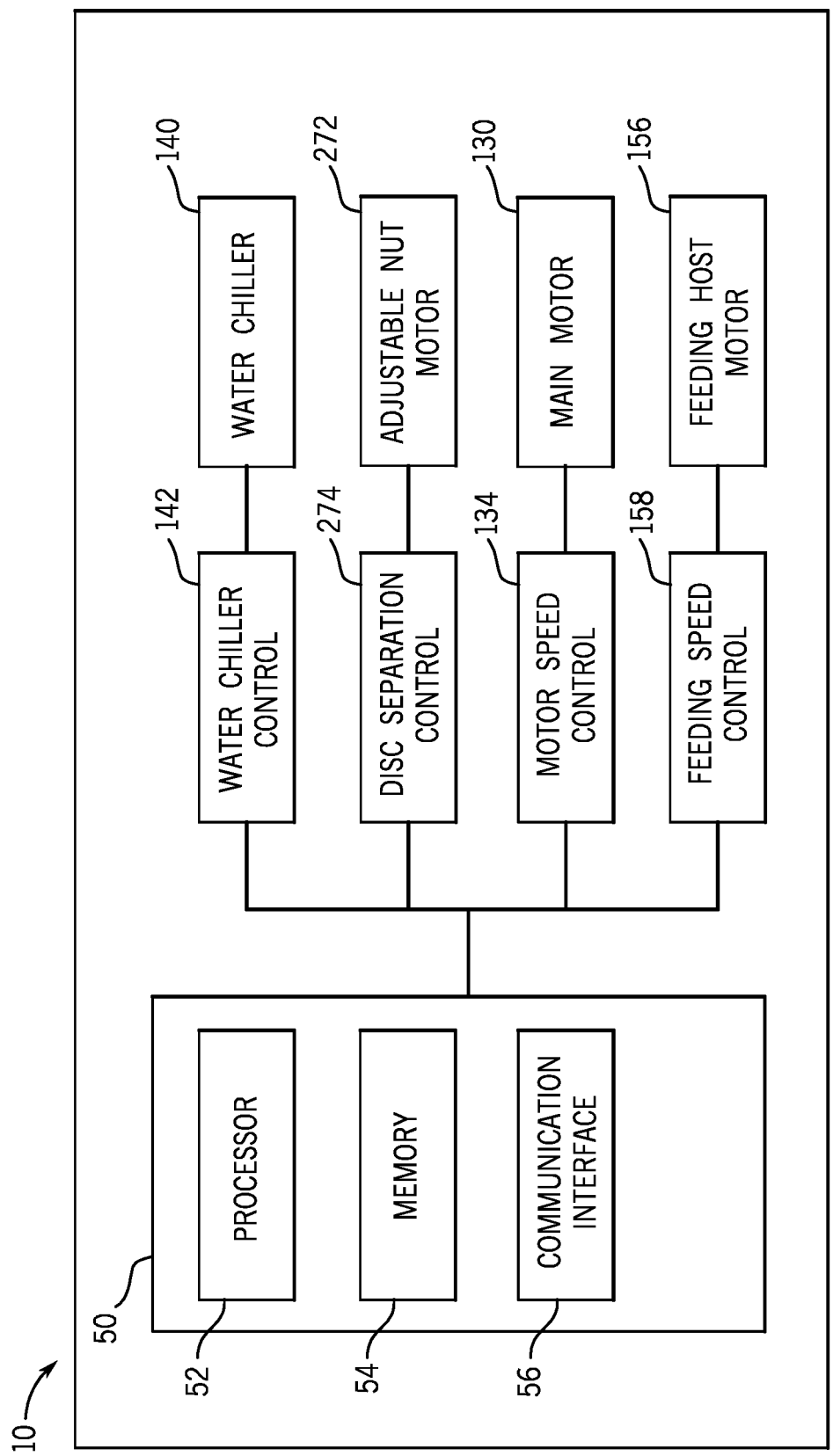
FIG. 15 is a layout of the main control panel.

With respect to the exemplary layout of FIG. 15, certain control and components are illustrated. A disc separation control 274 control adjusts the distance between the stationary disc plate 220 and the rotating disc plate 260 by moving the rotating disc plate 260 in or out via the adjustable nut motor 272. As such, a position of the rotating disc plate 260 relative to the stationary disc plate 220 is configured to be adjustable. A motor speed 134 control adjusts how fast the rotating disc plate 260 is rotating by adjusting the motor speed of the main motor 130. The feeding speed control 158 determines the volume of scrap going into the cutter disc compartment 200. The feeding speed control 158 may modulate a rotation speed of the auger 153. The at least one communications interface 56 may display current readings from the various controls. Of course, the main control panel 50 may include or direct additional controls of all of the features of the system 10 and its subsystems 100, 300, 500, and 700. Of course, the main control panel 50 may include fewer controls than shown in FIG. 15 or certain controls may be an integral portion of the respective equipment.

Other modules and subsystems of the system 10 will now be described. From the agglomerator subsystem 100, the beans are transferred to the mixing subsystem 300 that includes the vertical mixer 310, where the beans are mixed with additional beans of a different plastic material, natural fibers, or additives. Third, the mixture is transferred to the crushing subsystem 500, where the pulverizer 510 converts the mixture in a plastic composite powder. The plastic composite powder may now be ready for use in other industrial processes. Optionally, the plastic composite powder is transferred to the compounding subsystem 700, which may include the compound mixer 710.

Figure 11:
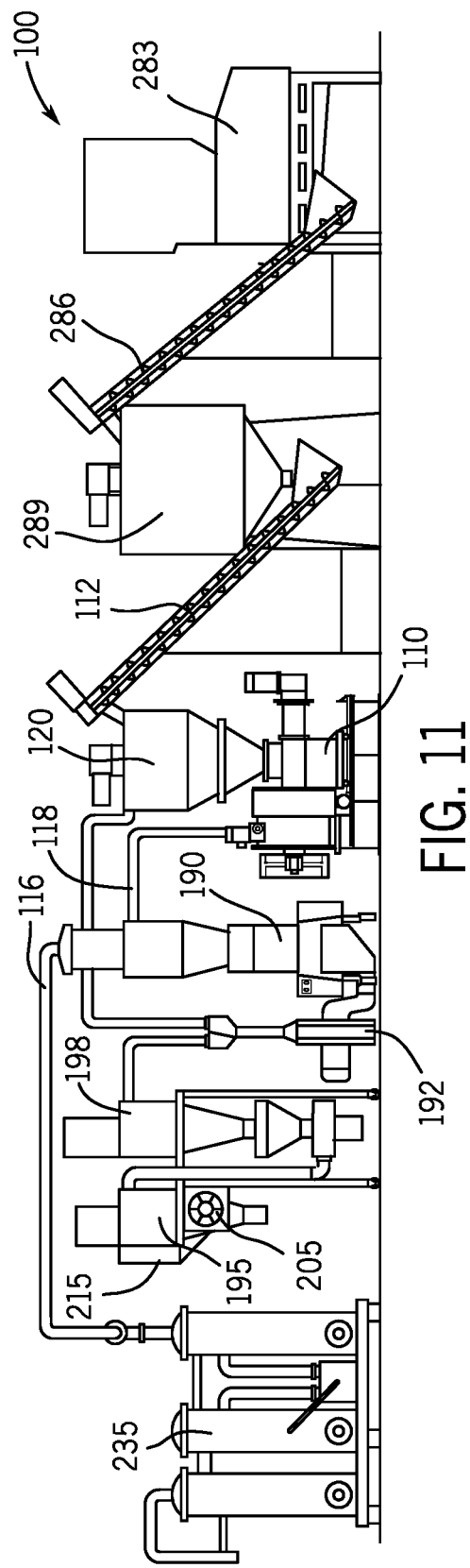
FIG. 11 is a schematic view of the agglomeration subsystem.

With reference to FIG. 11, the agglomerator subsystem 100 will now be described. The agglomerator subsystem 100 incudes a large shredder 283 that receives plastic crap materials from conveyor, auger, other bulk conveyance equipment. The large shredder 283 shreds large pieces of plastic scrap materials into smaller scraps. A second conveyer 286 transports the scrap from the large shredder 283 and feeds them into a front agitator 289 for temporary storage. The front agitator 289 includes stirring arms for material circulation and sensors for startup and pause. A third conveyer 112 transports the scrap pieces from the front agitator 289 and feeds them into the main agitator 120 of the agglomerator 110 for temporary collection or storage prior to passing cutting disc compartment 200 of the agglomerator 110. The agglomerator 110 converts the scrap into the twigs or beans with friction generated by stationary disc plate 220 and the rotating disc plate 260. The agglomerator 110 transfers the twigs and beans to the small shredder 190 via an outlet conduit 118. After shredding, a fan 192 blows the shredded beans from the small shredder 190 to the discharge hopper 195, which discharges the plastic beans into gaylord boxes after cooling. The discharge hopper 195 includes the large blowing fan 205 that blows the semi-agglomerated flakes of scraps out into the hopper collector 215, and then a vacuum feeder transports the flakes back to the main agitator 120 for reprocessing. An exhaust collector 235 collects exhaust gas from the agglomerator 110 and the small shredder 190 via exhaust 116. The water chiller 140 connects with the cutter disc compartment 200 from the agglomerator 110 to cool down the stationary disc plate 220 and its blades with circulated water.

Figure 12:
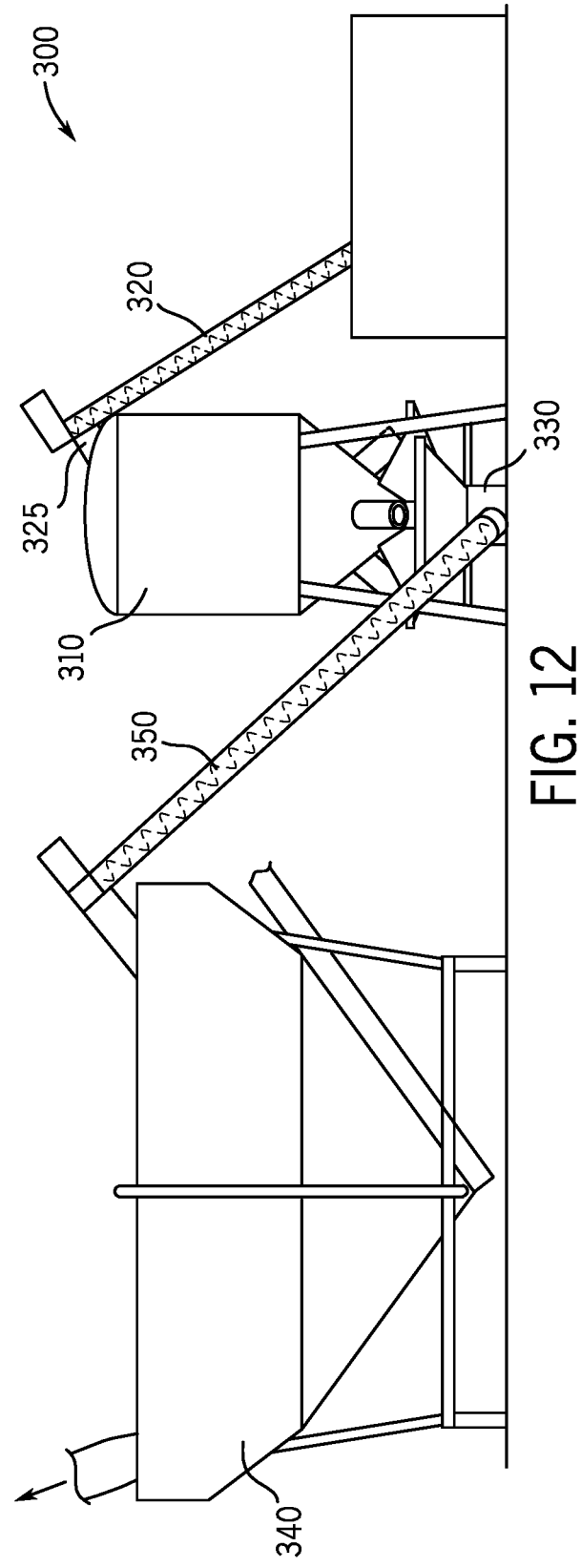
FIG. 12 is a schematic view of the mixing subsystem.

With reference to FIG. 12, the mixing subsystem 300 will now be described. At the mixing subsystem 300, the beans are received from the agglomeration subsystem 100. The beans are mixed with additional beans (or other materials) per a formulation, recipe, or other standards. The beans are mixed with the additional beans (or other materials) in the vertical mixer 310. The beans may be mixed for sufficient time to provide an evenly distributed mixture. In certain aspects, the bean mixture may be blended for several hours.

In this aspect, an auger feeder 320 transports the beans to an intake 325 of the vertical mixer 310. After sufficient mixing in the vertical mixer 310, the beans are transferred from an output 330 of the vertical mixer 310 to a storage hopper 340 via an auger conveyer 350. In the aspect shown, the maximum capacity of the vertical mixer 310 is approximately 2.5 tons, which mixes 5 gaylord boxes of beans (total 4,000 pounds) at a time. The average production output of the mixing subsystem 300 is approximately 1,000 pounds an hour. The storage hopper 340 temporarily stores the mixture of plastic beans for the next step in the process.

Figure 13:
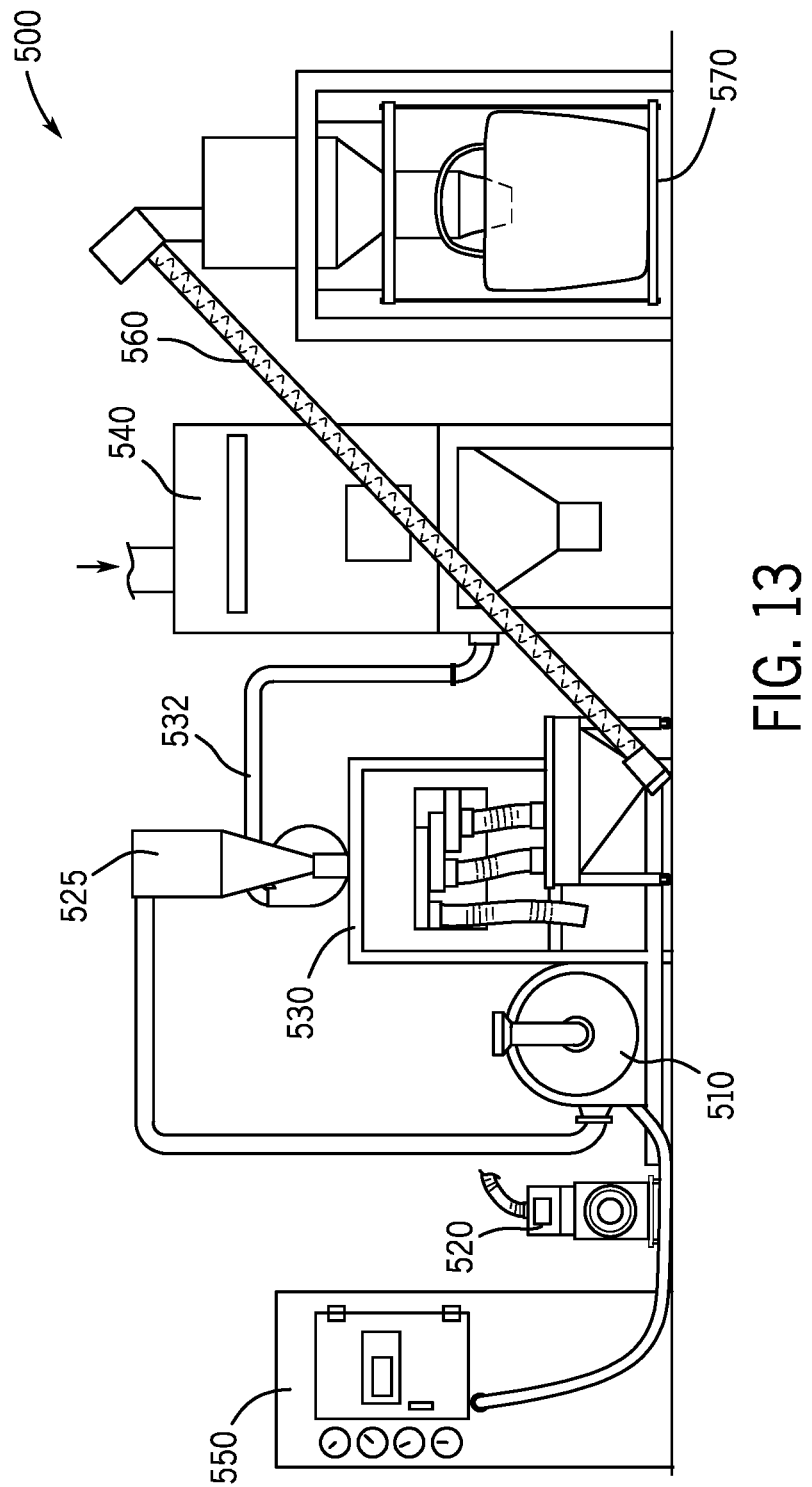
FIG. 13 is a schematic view of the crushing subsystem.

With reference to FIG. 13, the crushing subsystem 500 will now be described. The crushing subsystem 500 receives the mixture of plastic beans (possibly with fibers or additives) from the mixing subsystem 300. The pulverizer 510 crushes and pulverizes the mixture into a powder-like composite materials, weighs the composite materials, and packs the composite materials into super sack bags (500 KGS each bag) or other storage bags/containers using a rationed packing scale. The production output of each composite product varies, but the crushing subsystem averages 450-500 pounds an hour.

With continued reference to FIG. 13, a vacuum loader 520 sucks mixed plastic beans from the mixture in the storage hopper 340 and loads them into the plastic pulverizer 510. The plastic pulverizer 510 pulverizes the beans into a powder of the mixed plastic particles. The powder passes to a hopper 525 and then to a vibrating and screening device 530 which vibrates and screens the powder. The powder is formed to designated specifications by using different and successive layers of screening filters. A pulse dust collector 540 connects with the vibrating and screening device 530 via a blowing fan 532 to collect dust during the pulverization and screening processes. A water chiller 550 connects with the plastic pulverizer 510 to cool down the blades with circulated water. An auger conveyer 560 transports the powder from the vibrating and screening device 530 and feeds the powder into the super sack bag (or other container or bags) positioned on the rationed packing scale 570. The rationed packing scale 570 provides for bagged powder with designated weight.

Figure 14:
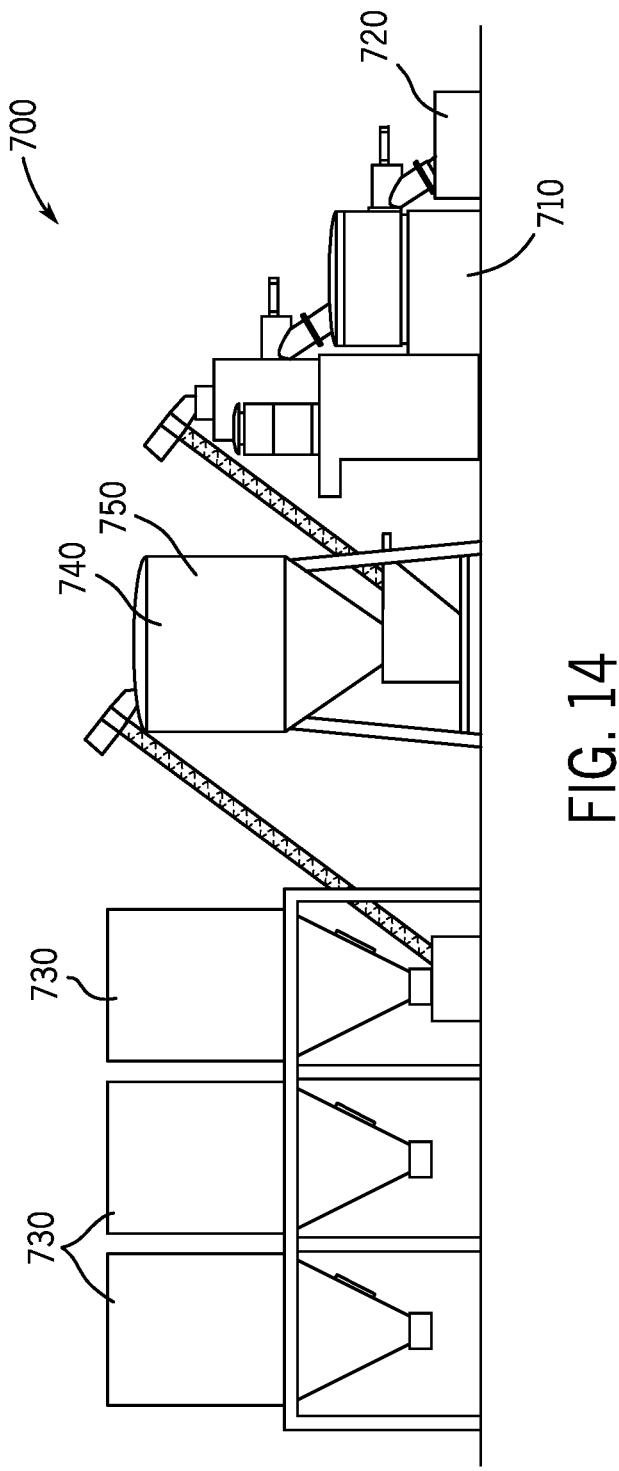
FIG. 14 is a schematic view of the compounding subsystem.

With reference to FIG. 14, the compounding subsystem 700 will now be described. The compounding subsystem 700 is optional. For certain applications, the powder material is not compounded. However, for certain applications, it is desired to compound the powder material with additional additives and/or materials. The compounding subsystem 700 compounds the pulverized plastic composite materials with wood powder, wood composite powder, paper powder, other natural fiber materials and additive materials per formulations, recipes, customer requests, etc. using the compound mixer 710. The compounded materials may be weighed and packed in super sack bags (or other bags or containers) by the rationed packing scale 570 of the crushing subsystem 500 or directed to a container 720 or other storage bag/box. The average production output of the compounding subsystem 700 is approximately 500 pounds an hour.

The compounding subsystem 700 may include a storage hopper system 730 that stores plastic pulverized composite materials, wood powder, wood composite powder, paper powder, other natural fiber materials and additive materials in each hopper, and gets the materials ready for compounding process. A dryer 740 and infrared silo 750 dry and infrared radiate the materials to ensure the materials are dry and sterilized prior to the compounding process. The high speed compound mixer 710 mixes plastic composite, wood powder, wood composite powder, paper powder, other natural fiber materials and additive materials altogether and turns them into the compound material.

As such, it should be understood that the disclosure is not limited to the particular aspects described herein, but that various changes and modifications may be made without departing from the spirit and scope of this novel concept as defined by the following claims. Further, many other advantages of applicant's disclosure will be apparent to those skilled in the art from the above descriptions and the claims below.

What is claimed is:

1. A system for the recovery of mixed multi plastic and natural fiber materials, comprising:
   an agglomerator, the agglomerator comprising:
      a cutting disc compartment configured to receive scraps of mixed multilayer plastic film materials;
      the cutting disc compartment comprising a stationary disc plate and a rotating disc plate;
      a motor configured to rotate the rotating disc plate;
      a main control panel;
      a liquid chiller, and the main control panel in communication with the liquid chiller;
      the liquid chiller fluidly connected to the stationary disc plate, the liquid chiller configured to cool the stationary disc plate, wherein the main control panel modulates a level of cooling provided by the liquid chiller to the stationary disc plate to maintain a temperature differential between the rotating disc plate and the stationary disc plate and to maintain a temperature of the mixed multilayer plastic film materials below a melt index of the mixed multilayer plastic film materials;
      a feeding host;
      an agitator to receive the scraps of mixed multilayer plastic film materials, the agitator positioned over the feeding host;
      the feeding host positioned to direct to the scraps of mixed multilayer plastic film materials to the cutting disc compartment;
      the cutting disc compartment configured to agglomerate the scraps of the mixed multilayer plastic film materials into agglomerated particles; a cutting space is formed between the stationary disc plate and the rotating disc plate, wherein the stationary disc plate includes a central opening, an end of an auger passes to or into the central opening and directs the scraps to or through the central opening, wherein the central opening leads to the cutting space between the rotating disc plate and the stationary disc plate;
   a shredder configured to receive the agglomerated particles from the agglomerator; and,
   the main control panel to control the shredder and the agglomerator.

2. The system according to claim 1, further comprising an adjustable nut configured to move the rotating disc plate toward and away from the stationary disc plate.

3. The system according to claim 1, further comprising a replaceable pipe positioned under the cutting disc compartment, and a fan configured to blow plastic particles through the replaceable pipe and to the shredder.

4. The system according to claim 1, further comprising a disc separation distance control configured to modulate a distance between the stationary disc plate and the rotating disc plate.

5. The system according to claim 1, further comprising a motor speed control configured to modulate a speed that the rotating disc plate is rotating by adjusting a motor speed of the motor.

6. The system according to claim 1, further comprising a feeding speed control configured to modulate a volume of the scrap directed to the cutting disc compartment.

7. The system according to claim 6, wherein the feeding speed control is configured to modulate a rotation speed of an auger of the feeding host.

8. The system according to claim 1, wherein the chiller is configured to maintain a temperature of the stationary disc plate at approximately 30 degrees C. to approximately 45 degrees C. during operation of the system.

9. The system according to claim 1, wherein the agglomerator forms the agglomerated particles between the stationary disc plate and the rotating disc plate.

10. The system according to claim 9, wherein a position of the rotating disc plate relative to the stationary disc plate is configured to be adjustable.

11. The system according to claim 1, wherein a discharge hopper receives shredded particles from the shredder, and a fan blows flakes from the shredded particles.

12. The system according to claim 11, wherein the fan is configured to blow at or against a stream of the shredded particles in order to separate the flakes from the shredded particles, the flakes collect in a hopper collector, and the flakes are transferred back to the agitator for reprocess.

13. The system according to claim 1, wherein the main control panel communicates with other operators, a central processing center, or control panels controlling other systems in remote locations such that production output data, productivity data, and supply data is transferred and collected.

14. The system according to claim 1, wherein the stationary disc plate comprises a concave surface, and the rotating disc plate comprises a convex surface, and the rotating disc plate is opposite of the stationary disc plate to form the cutting space between the stationary disc plate and the rotating disc plate.

15. The system according to claim 14, wherein the concave surface of the stationary disc plate comprises include blades of a same size, and the convex surface of the rotating disc plate includes additional blades having longer and shorter sizes.

16. The system according to claim 15, wherein an outer surface of the blades of the concave surface of the stationary disc plate are approximately 0.5 mm to 6.5 mm from an outer surface of the additional blades of the convex surface.

17. The system according to claim 1, wherein a shaft is engaged to the motor, the shaft rotates the rotating disc plate, and an adjustable nut compartment moves the shaft parallel to an axis rotation of the shaft to move the rotating disc plate toward and away from the stationary disc plate.

18. The system according to claim 1, wherein the stationary disc plate comprises a concave surface, and the rotating disc plate comprises a convex surface, wherein the concave surface of the stationary disc plate comprises include blades, and the convex surface of the rotating disc plate includes blades of different sizes.

19. The system according to claim 1, wherein the stationary disc plate comprises a concave surface, and the rotating disc plate comprises a convex surface, wherein the concave surface of the stationary disc plate comprises include blades, and the convex surface of the rotating disc plate includes short blades and long blades.

20. The system according to claim 19, wherein the convex surface of the rotating disc plate includes four short blades and two long blades.

\* \* \* \* \*